US008832044B1

(12) United States Patent  
Gipp et al.

(10) Patent No.: US 8,832,044 B1  
(45) Date of Patent: Sep. 9, 2014

(54) TECHNIQUES FOR MANAGING DATA COMPRESSION IN A DATA PROTECTION SYSTEM

(75) Inventors: Stephan Kurt Gipp, Inver Grove Heights, MN (US); Jeremy Howard Wartnick, Minnetonka, MN (US)

(73) Assignee: Symantec Corporation, Mountain View, CA (US)

( * ) Notice: Subject to any disclaimer, the term of this patent is extended or adjusted under 35 U.S.C. 154(b) by 982 days.

(21) Appl. No.: 12/397,656

(22) Filed: Mar. 4, 2009

(51) Int. Cl.  
G06F 17/30 (2006.01)  
G06F 7/00 (2006.01)

(52) U.S. Cl.  
USPC .......................................... 707/693

(58) Field of Classification Search  
USPC .......................................... 707/693  
See application file for complete search history.

(56) References Cited

U.S. PATENT DOCUMENTS

| | | | | |
|---|---|---|---|---|
| 5,463,772 | A  * | 10/1995 | Thompson et al. ........... | 707/693 |
| 6,937,767 | B1 * | 8/2005  | Burak et al. ................. | 382/232 |
| 7,751,628 | B1 * | 7/2010  | Reisman ...................... | 382/232 |
| 2006/0195464 | A1 * | 8/2006 | Guo ............................. | 707/101 |

OTHER PUBLICATIONS

Arvin, et al., "A Hierarchical Storage Management (HSM) Scheme for Cost-Effective on-line Archival Using Lossy Compression", (Abstract Only) Journal of Digital Imaging Springer New York, vol. 14, No. 1, pages, Mar. 2002, Retrieved from the Internet at: http://www.springerlink.com/content/yd0pnea5v1ddg36/.

Unknown, "A CommVault White Paper: CommVault Galaxy Backup & Recovery", CommVault Systems, Inc.; 2008; pp. 1-39, retrieved from the Internet at: http://www.commvault.com/pdf/CommVault_GalaxyBackupandRecovery.pdf.

Unknown, EMC2 Data Sheet: EMC NetWorker, Retrieved from the Internet at: http://www.emc.com/collateral/software/data-sheet/h2257-networker-ds.pdf, Apr. 2009.

Unknown, Ask MetaFilter: What is the Best Codec, Settings and Software to Backup Animation (Disney, Pixax) DVD's?, Retrieved from the Internet on May 13, 2009 at: http://ask.metafilter.com/78656/What-is-the-best-codec-settings-and-software-to-backup-animation-Disney-Pixax-DVDs.

* cited by examiner

Primary Examiner — Kuen Lu  
(74) Attorney, Agent, or Firm — Wilmer Cutler Pickering Hale and Dorr LLP (57) ABSTRACT

Techniques for managing data compression in a data protection system are disclosed. In one particular exemplary embodiment, the techniques may be realized as a method for managing data compression comprising receiving a request for a data operation, analyzing a data management policy associated with the request, identifying a compression level associated with one or more portions of data in the data operation based at least in part on the data management policy, and identifying a compression algorithm to be used for one or more portions of data in the data operation.

19 Claims, 4 Drawing Sheets

TECHNIQUES FOR MANAGING DATA COMPRESSION IN A DATA PROTECTION SYSTEM

FIELD OF THE DISCLOSURE

The present disclosure relates generally to data compression and, more particularly, to techniques for managing data compression in a data protection system.

BACKGROUND OF THE DISCLOSURE

Data protection systems are increasingly used to serve growing amounts of data. For example, increased use of multi-media and other file formats may require greater data storage. Also, larger file sizes may increase processing and retrieval times. Data compression may be used to address some of these challenges.

Data compression may use different algorithms, including lossless compression algorithms and lossy compression algorithms. Lossless compression algorithms may preserve data fidelity, but may not reduce the size of files of one or more file format types as significantly as lossy compression algorithms. Lossy compression algorithms may provide more significant file size reductions, but may sacrifice data fidelity.

Different data file backups and/or copies may have different fidelity requirements depending on the purpose of the data file, the type of data, and other factors. Users of a data protection system may be required to apply a single compression algorithm for an entire backup and/or copy regardless of different file types in the backup and/or copy.

In view of the foregoing, it may be understood that there may be significant problems and shortcomings associated with current technologies utilized for managing data compression in a data protection system.

SUMMARY OF THE DISCLOSURE

Techniques for managing data compression in a data protection system are disclosed. In one particular exemplary embodiment, the techniques may be realized as a method for managing data compression comprising receiving a request for a data operation, analyzing a data management policy associated with the request, identifying a compression level associated with one or more portions of data in the data operation based at least in part on the data management policy, and identifying a compression algorithm to be used for one or more portions of data in the data operation.

In accordance with other aspects of this particular exemplary embodiment, the request for a data operation may comprise a request for at least one of: a backup, an archive, a replication, data compression, and a copy.

In accordance with further aspects of this particular exemplary embodiment, identifying a compression algorithm to be used for one or more portions of data may be based at least in part on a file type associated with the data.

In accordance with additional aspects of this particular exemplary embodiment, identifying a compression algorithm to be used for one or more portions of data may be based at least in part on the identified compression level.

In accordance with additional aspects of this particular exemplary embodiment, the data management policy may specify a compression level to use based at least in part on a data operation type.

In accordance with additional aspects of this particular exemplary embodiment, the data management policy may specify a compression level to use based at least in part on a destination storage media type.

In accordance with additional aspects of this particular exemplary embodiment, the data management policy may specify a maximum permissible compression ratio.

In accordance with additional aspects of this particular exemplary embodiment, the data management policy may indicate when use of a lossy compression algorithm is permissible.

In accordance with additional aspects of this particular exemplary embodiment, the data operation may comprise a backup and the compression level may be identified based at least in part on an intended use of the one or more portions of data in the data operation.

In accordance with additional aspects of this particular exemplary embodiment, the data operation may comprise a backup and the compression level identified may be based at least in part on a group associated with the one or more portions of data in the data operation.

In accordance with additional aspects of this particular exemplary embodiment, managing data compression may further comprise receiving a request to restore data, identifying two or more copies of the requested data, and determining which copy of the requested data to restore based at least in part on one or more specified options.

In accordance with additional aspects of this particular exemplary embodiment, the one or more specified options may include at least one of: a desired fidelity level of the requested data, a desired restoration speed, an identified location of the requested data, and an identified access to the requested data.

In accordance with additional aspects of this particular exemplary embodiment, the techniques for managing data compression may be realized as at least one processor readable carrier for storing a computer program of instructions configured to be readable by at least one processor for instructing the at least one processor to execute a computer process for performing the method as recited in claim 1.

In another particular exemplary embodiment, the techniques may be realized as an article of manufacture for managing data compression. The article of manufacture may comprise at least one processor readable carrier, and instructions carried on the at least one carrier, wherein the instructions are configured to be readable from the at least one carrier by at least one processor. The instructions may thereby cause the at least one processor to operate so as to receive a request for a data operation, analyze a data management policy associated with the request, identify a compression level associated with one or more portions of data in the data operation based at least in part on the data management policy, and identify a compression algorithm to be used for one or more portions of data in the data operation.

In yet another particular exemplary embodiment, the techniques may be realized as a system for managing data compression comprising one or more processors communicatively coupled to a server. The server may be configured to receive a request for a data operation, analyze a data management policy associated with the request, identify a compression level associated with one or more portions of data in the data operation based at least in part on the data management policy, and identify a compression algorithm to be used for one or more portions of data in the data operation.

In accordance with other aspects of this particular exemplary embodiment, the request for a data operation may comprise a request for at least one of: a backup, an archive, a replication, data compression, and a copy.

In accordance with further aspects of this particular exemplary embodiment, identifying a compression algorithm to be used for one or more portions of data may be based at least in part on a file type associated with the data.

In accordance with additional aspects of this particular exemplary embodiment, the data management policy may specify a maximum permissible compression ratio.

In accordance with additional aspects of this particular exemplary embodiment, the data management policy may indicate when use of a lossy compression algorithm is permissible.

In accordance with additional aspects of this particular exemplary embodiment, the data operation may comprise a backup and the compression level may be identified based at least in part on an intended use of the one or more portions of data in the data operation.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
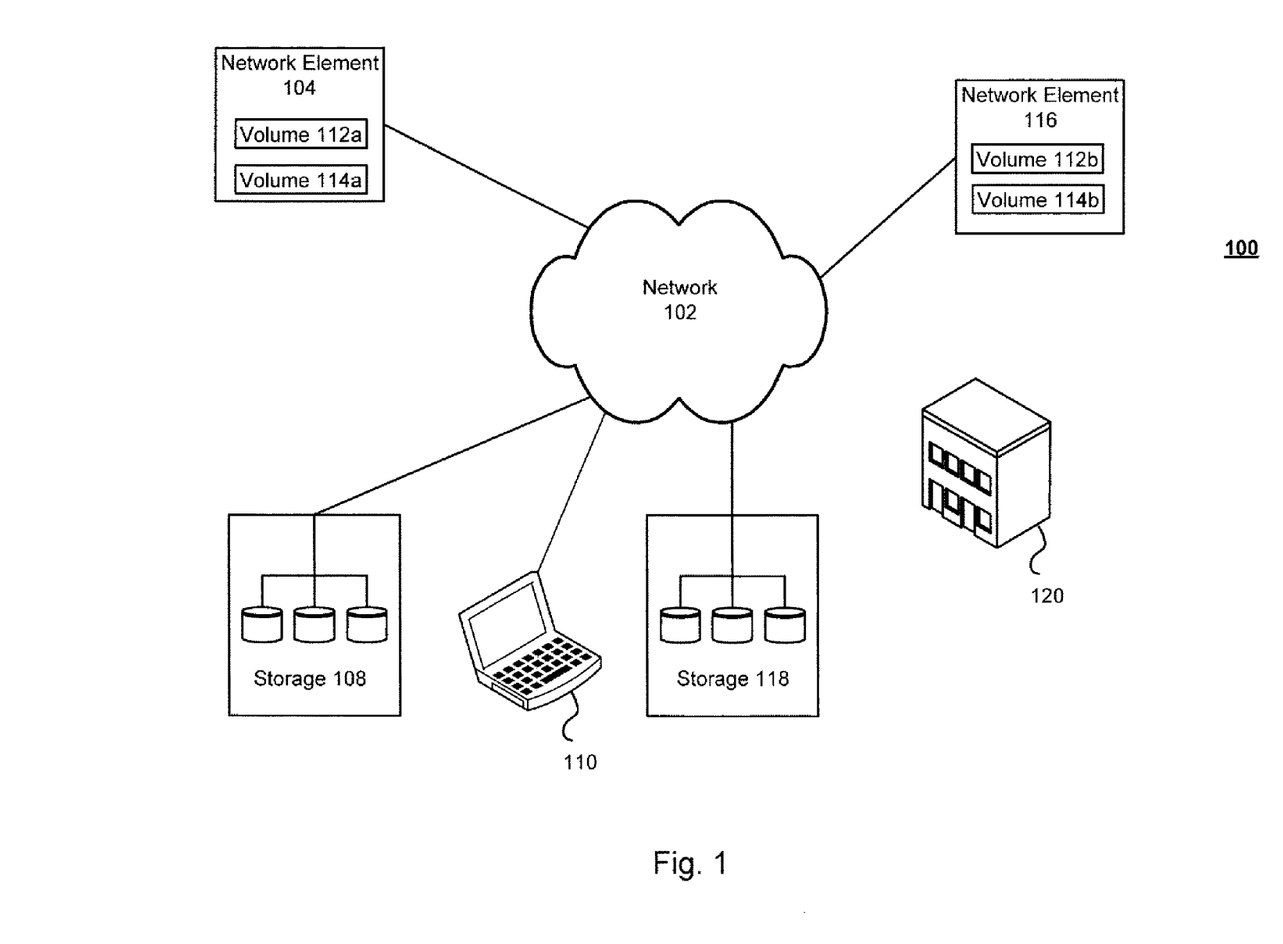
FIG. 1 shows a system 100 for managing data compression in a data protection system in accordance with an embodiment of the present disclosure.

Referring to FIG. 1, there is shown a system 100 for managing data compression in a data protection system in accordance with an embodiment of the present disclosure. FIG. 1 is a simplified view of system 100, which may include additional elements that are not depicted. In system 100, network elements 104 and 116 may be communicatively coupled to network 102. Network element 104 may contain volumes 112a and 114a. Network element 116 may contain volumes 112b and 114b. Storage 108 and 118 may also be communicatively coupled to network 102. Computer 110 may further be communicatively coupled to network 102. Remote storage 120 may store data that it receives via postal or delivery mechanisms. In one or more embodiments, remote storage 120 may additionally be communicatively coupled to network 102.

Network 102 may be a local area network (LAN), a wide area network (WAN), the Internet, a cellular network, a satellite network, or another network that permits communication between network elements 104 and 116, storage 108 and 118, computer 110, and other devices communicatively coupled to network 102.

Network elements 104 and 116 may be application servers, backup servers, network storage devices, or other devices communicatively coupled to network 102. Network elements 104 and 116 may utilize storage 108 and 118 for the backup of application data or other data.

Storage 108 and 118 may be local, remote, or a combination thereof to network elements 104 and 116. Storage 108 and 118 may utilize a redundant array of inexpensive disks (RAID), a redundant array of inexpensive nodes (RAIN), tape, disk, or other computer accessible storage. In one or more embodiments storage 108 and 118 may be a storage area network (SAN), an internet small computer systems interface (iSCSI) SAN, a Fibre Channel SAN, a common Internet File System (CIFS), network attached storage (NAS), or a network file system (NFS).

Remote storage 120 may be offline storage, nearline storage, storage used for archival purposes, or storage used for other purposes. Remote storage 120 may be a facility hosting a tape library, storage for recordable media, storage for external hard drives, or other storage. According to one or more embodiments, remote storage 120 may be network accessible via network 102.

According to one or more embodiments, storage 108, 118, and remote storage 120 may be part of a data storage technique such as tiered storage or hierarchical storage. According to some embodiments, storage 108, 118, and remote storage 120 may not follow a conventional tiered storage model or hierarchical model, but may store data according to one or more data management policies.

Volumes 112a, 114a, 112b, and 114b may include data written by one or more applications, such as mail servers, databases, web servers, collaboration software, or other applications hosted by network elements 104 and 116. Volumes 112a, 114a, 112b, and 114b may contain one or more user created data files such as, for example, a document, a list, an image file, an email, a file, a posting, a web page, xml data, a sound file, and a video file. Volumes 112a, 114a, 112b, and 114b may contain data stored in one or more formats or data structures. Data structures may be determined by an underlying platform or system supporting an application. Volumes 112a, 114a, 112b, and 114b may be unshared storage containing clustered data.

Computer 110 may be a desktop computer, a laptop computer, a server, a backup server, or other computer capable of managing data compression in a data protection system. Computer 110 may receive data from user input, a network management system, a network provisioning system, a management information base, a database, a file, a web service, and/or an application programming interface. Computer 110 may query other systems and/or local or remote storage such as network elements 104 and 116, and storage 108 and 118 to manage requests for one or more data operations, create, modify, or access data management policies, and/or query storage information. Computer 110 may be able to communicate with nodes, hosts, applications, and/or storage locations directly via an Application Programming Interface (API), a Remote Procedure Call (RPC), interface tables, a web service, Extensible Markup Language (XML) based interfaces, Simple Object Access Protocol (SOAP) based interfaces, common request broker architecture (CORBA) based interfaces, and/or other interfaces for sending or receiving information.

In one or more embodiments, network element 104 may be a production system, such as a server, a database, a host, a client, or other computing system storing data. Multiple copies of one or more portions of data on network element 104 may be made and stored in one or more formats and for a plurality of purposes. For example, data may be copied, replicated, or backed up or otherwise provided to network element 116. Network element 116 may serve as a backup server. Data, such as volumes 112*a* and 114*a*, may be copied, replicated, or backed up to volumes 112*b* and 114*b*, respectively. Volumes 112*b* and 114*b* may be uncompressed data. In one or more embodiments, data stored on network element 116 may be in a backup format, such as a backup image, a snapshot, or other formats.

According to one or more embodiments, backup data from network element 104 may be copied, formatted, compressed, and/or processed further as part of subsequent life cycle management changes. For example, as described above an initial backup may be made to storage on network element 116. Other backups, copies, archives, or data operations may be performed. Storage 108 may store data which is stored in a lossless, compressed format.

A framework of a data protection system may associate one or more algorithms with a file type. A data management policy may associate other attributes of data with a data management policy. For example, attributes may include data ownership, author, data type, creation date, expiration date, edit date, last access date, data size, and data purpose. Copies of data may be made for multiple purposes, including an initial backup, a backup for legal compliance (e.g., Sarbanes-Oxley compliance, Health Insurance Portability and Accountability Act (HIPAA) compliance), for financial purposes (e.g., tax records, transactional records), and for other purposes (e.g., employee records, medical records used in a study, etc.). A data management policy may specify a compression level that may be used on one or more portions of data based at least in part on one or more attributes of data, the purpose of the data, the storage location of the data, and/or other factors.

In one or more embodiments, computer 110 may be a backup server or other computing platform managing or administering a data protection system. A data operation request such as a backup request, an archive request, a replication request, a copy request, or a deletion request may be received by computer 110. For example, computer 110 may receive a backup request for data on network element 104. Data on network element 104 may be backed up initially in a uncompressed format, such as to network element 116.

Computer 110 may also receive a data operation request to backup data to nearline storage. For example, storage 108 may be nearline storage. The compression level of one or more portions of data in a backup image may be determined by a data management policy. As a non-limiting example, one or more portions of a backup image may be losslessly compressed and stored on storage 108. According to some embodiments, one or more portions may also be lossy compressed.

Computer 110 may further receive a data operation request to backup data to an archive site. For example, data may be backed up to tape and shipped to remote storage 120. This may be to comply with a disaster recovery plan of a data management policy. A backup image stored on tape may be comprised of multiple types of data. For example, a backup image may contain text files, database data, image data (e.g., jpeg files, gif files, etc.), audio data (e.g., MP3 files, Wave files, etc.), video data (e.g., MPEG files, MOV files, etc.), or application and storage specific formats. Computer 110 may determine a data type or file type by analyzing content, metadata, a file extension, and/or file attributes associated with the data.

An archive request received by computer 110 may enable compression of data to be archived. One or more portions of data in a backup image may be lossy compressed based on a type of data and a data management policy associated with the data. For example, one or more portions of a backup image may be image files that may be lossy compressed.

A data management policy may determine not only whether one or more portions of a backup image may be compressed, but also the compression ratio that may be utilized. For example, computer 110 may prepare a backup image of data which may contain multi-media files such as images. Computer 110 may utilize a data management policy, metadata associated with the backup data, file types of the backup data, compression algorithms associated with a backup data type, or other backup data attributes in order to determine whether to compress one or more portions of data, what compression algorithm to use for one or more portions of data, what compression level to use for one or more portions of data, or other compression settings. For example, backup data may contain medical images. The data management policy may require medical images to use lossless compression for an initial backup and lossy compression for archival after a certain number of years. Furthermore, for medical images in which lossy compression is permitted a level of compression may be specified. For example, the compression ratio may be determined by a type of medical data (e.g., X-rays may be compressed to a first specified maximum compression level in order to preserve relevant medical information and CAT scans may be compressed to a second specified maximum compression level). Computer 110 may also determine a data type of one or more portions of a backup image and may match a data type to a compression algorithm. In one or more embodiments, maximum compression of a backup image may be achieved by evaluating one or more portions of the backup image individually to enable appropriate compression for the individual portions of the backup image.

A data protection system may enable the use of multiple compression algorithms, different compression types (e.g., lossy, lossless), multiple compression levels, and/or other compression settings within a single data operation such as a backup. The different compression settings may be on a file by file basis within a backup. The different compression settings may be modified at each data operation. This may enable progressive reduction of storage space required for a data set and further compression as data ages. Data compression settings may be managed by a data management policy and may be independent of a storage platform, of a data age, or of other factors (e.g., an archival copy may be maintained losslessly regardless of the data age). A data protection system may use a data management policy to manage a plurality of copies of a set of data to ensure that the plurality of copies comply with individual requirements (e.g., legal compliance, business purposes, tax purposes, disaster recovery, etc.) by using the minimum storage needed for fidelity. A data protection system may also expire and/or delete unneeded data.

A user may specify one or more compression algorithms to utilize for a particular file and/or data type. For example, a user may specify a lossless compression algorithm to used for a file type and a lossy compression algorithm to be used for the file type. According to one or more embodiments, a data management policy may specify whether to use the associated lossy compression algorithm or the associated lossless compression algorithm.

Certain backup images, portions of backup images, and/or data files may have uses or other criteria specified in metadata associated with the images and/or files. The criteria specified in metadata may influence or determine a compression type or a compression level to be used for the images and/or files. For example, artistic image data may be flagged in metadata so that lossless compression is not used. Artistic sound data may be flagged so that lossy compression may be used but the compression level may be limited so that no loss may occur in a human perceptible range.

Figure 2:
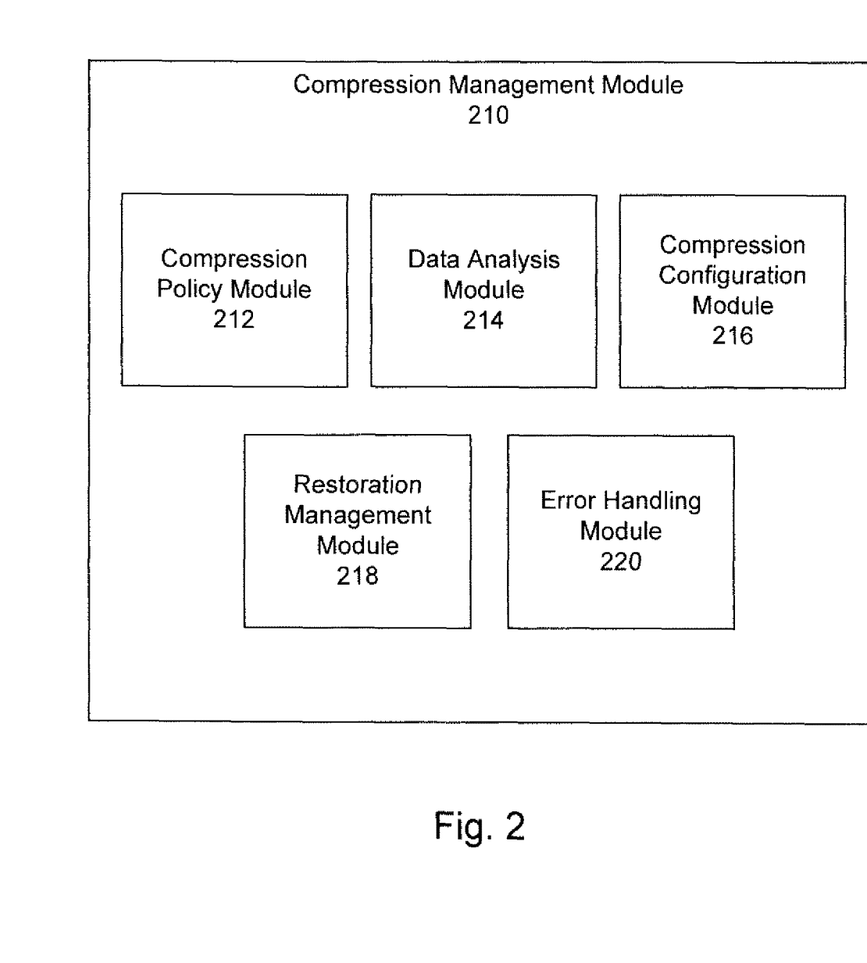
FIG. 2 shows a module for managing data compression in a data protection system in accordance with an embodiment of the present disclosure.

Referring to FIG. 2, there is shown a module 210 for managing data compression in a data protection system in accordance with an embodiment of the present disclosure. As illustrated in FIG. 2, the compression management module 210 may contain one or more components including compression policy module 212, data analysis module 214, compression configuration module 216, restoration management module 218, and error handling module 220. One or more of these components may be executed on a computing platform associated with a data protection system. For example, computer 110 of FIG. 1 may be a backup server which may utilize one or more components of module 210.

Compression policy module 212 may enable the creation, modification, and deletion of one or more data management policies. Data management policies may specify compression algorithms to be used for one or more file types, compression types to be used (e.g., lossy, lossless), compression levels to be used, and other file operation rules. In one or more embodiments, compression policy module 212 may provide a user interface for viewing, creation, modification, and deletion of one or more data management policies.

Data analysis module 214 may analyze one or more portions of backup data including, but not limited to, file size, data type, destination storage media type, and file purpose (e.g., medical, legal, tax, business, archive, etc.). Data analysis module 214 may provide information to compression configuration module 216.

Compression configuration module 216 may analyze a data operation request, data management policy information, information received from data analysis module 214 and other factors prior to configuring compression for the data operation request. In one or more embodiments, compression configuration module 216 may, after analyzing data and determining permissible and possible compression settings, automatically configure one or more compression settings and/or perform compression. According to some embodiments, compression configuration module 216 may provide an interface, such as a user interface, for selecting among available compression settings or verifying suggested compression settings for one or more portions of a data operation request.

Restoration management module 218 may provide a user interface enabling a user to view one or more options and one or more copies of a requested file, backup image, or other data to restore. Restoration management module 218 may enable a user to view a fidelity level of data (e.g., a loss of fidelity via lossy compression), a compression ratio of data, a compression type of data (e.g., compression algorithm used, lossy, and lossless), a storage media used for the data, a backup date of the data, and other attributes. A user may be able to choose among a fidelity level of the data, an estimated restoration speed, and other factors.

Error handling module 220 may handle errors associated with managing data compression in a data protection system. Error handling module 220 may log errors, send notifications, provide warnings, and/or perform corrective actions. For example, error handling module 220 may retry compression of a file, attempt restoration of a file from a different source, and/or retry restoration of a file.

Figure 3:
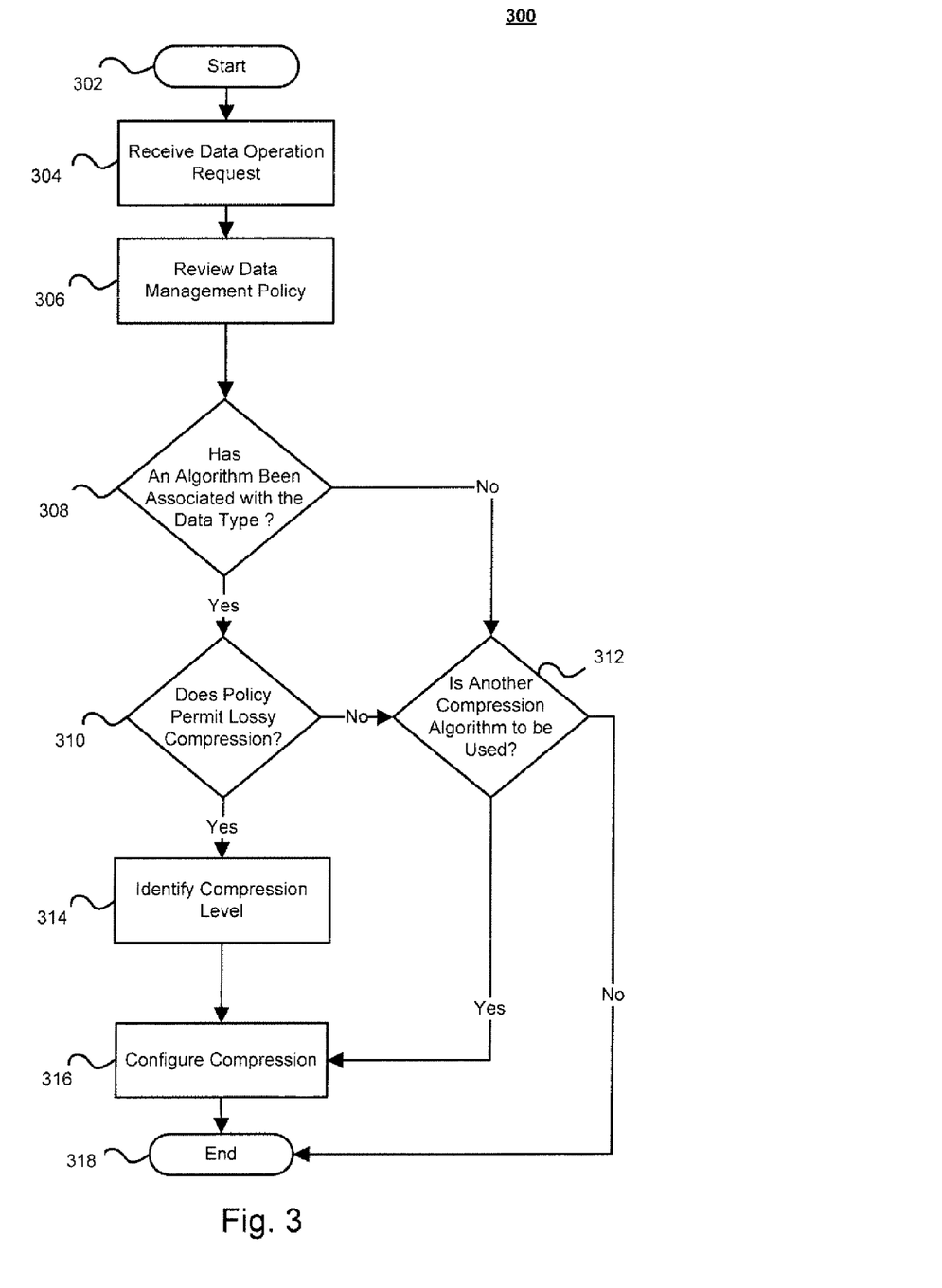
FIG. 3 shows a method 300 for managing data compression in a data protection system in accordance with an embodiment of the present disclosure.

Referring to FIG. 3, there is shown a method 300 for managing data compression in accordance with an embodiment of the present disclosure. At block 302, the method 300 for managing data compression, in accordance with an exemplary embodiment, may begin.

At block 304, the method 300 may receive a data operation request. The data operation request may include a request for a backup, a data copy request, expiration or deletion of data, a request to move data, a request to archive data, or other requests.

At block 306, the method 300 may review a data management policy. One or more components or processes of a data protection system may identify one or more attributes associated with data of the data operation request.

At block 308, the method 300 may determine whether a compression algorithm has been associated with a data type. By way of non-limiting example, a data operation request may contain one or more image files, such as GIF files. The method 300 may determine, in this example, whether a compression algorithm is associated with GIF files. If a compression algorithm has been associated with one or more data types of the data operation request, the method 300 may continue at block 310. If a compression algorithm has not been associated with one or more data types of the data operation request, the method 300 may continue at block 312.

At block 310, the method 300 may determine whether a data management policy permits lossy compression. One or more components or processes of a data protection system may determine whether lossy compression may be utilized. If a data management policy permits lossy compression, the method 300 may continue at block 314. If a data management policy does not permit lossy compression the method 300 may continue at block 312.

At block 312, the method 300 may determine whether another compression algorithm is to be used for one or more portions of a data operation request. According to one or more embodiments, a default compression algorithm may be used. According to some embodiments, a user may be prompted to specify or associate a compression algorithm. If another compression algorithm is to be used the method 300 may continue at block 316. If another compression algorithm is not to be used the method 300 may end at block 318.

At block 314, the compression level may be identified. The identification may be based at least in part on one or more identified attributes which may include a data type, a data operation type, a data age, data ownership, a purpose of a data operation (e.g., archive backup, legal backup, etc.), or other attributes. The compression level may be identified by method 300 in accordance with a data management policy. For example, the policy may specify a maximum loss of fidelity that is allowable for a particular type of data for a particular backup (e.g., medical data of a certain type backed up for diagnostic purposes may be allowed a 10:1 compression ratio, artistic image files may not be allowed a loss of fidelity, thus compression of artistic data may use lossless compression algorithms).

At block 316, compression for one or more portions of a data operation request may be configured.

At block 318, the method 300 may end.

Figure 4:
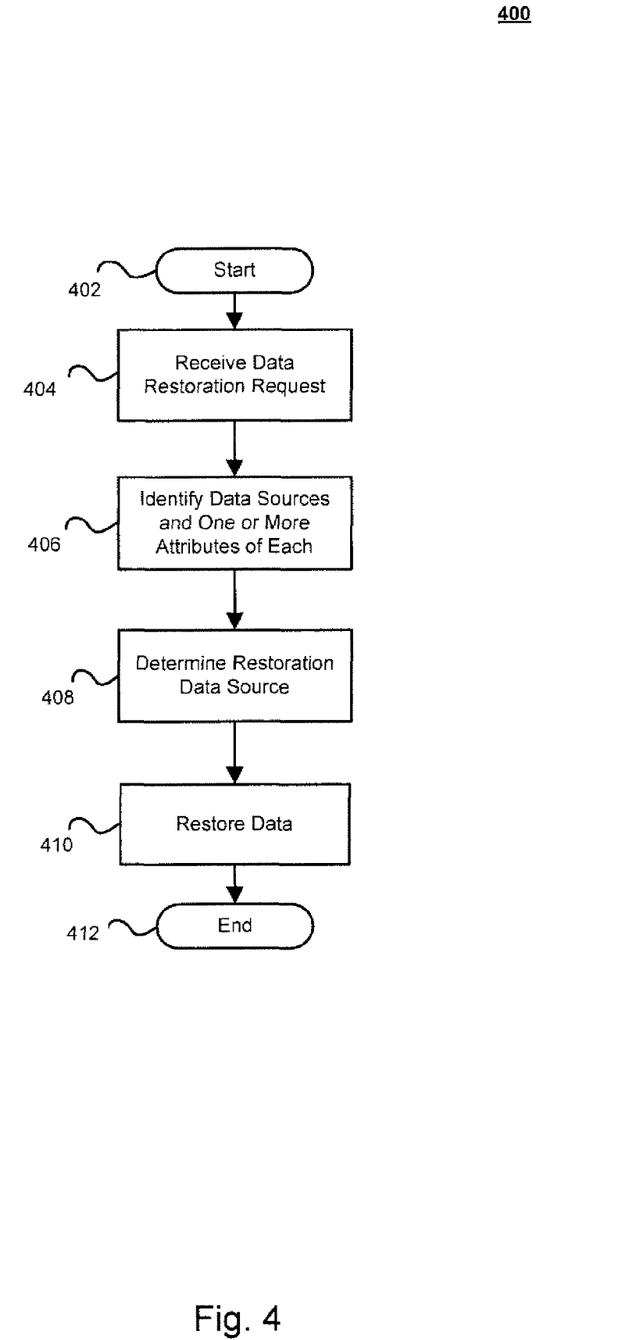
FIG. 4 shows a method 400 for retrieving compressed data in a data protection system in accordance with an embodiment of the present disclosure.

Referring to FIG. 4, there is shown a method 400 for retrieving compressed data in a data protection system in accordance with an embodiment of the present disclosure. At block 402, the method 400 for retrieving compressed data in a data protection system, in accordance with an exemplary embodiment, may begin.

At block 404, a data restoration request may be received.

At block 406, one or more sources of data for the restoration request and one or more corresponding attributes of each source may be identified. Attributes may include, but are not limited to: a data location, a data storage type, a compression level, a fidelity level, a creation date, and a modification date.

At block 408, the method 400 may determine a restoration data source. According to one or more embodiments, a user interface may be presented prompting a user with one or more data restoration source choices and one or more corresponding data source attributes. According to some embodiments, the method 400 may identify a data restoration source based upon one or more specified criteria. Specified criteria may include a minimum allowable fidelity level, a maximum allowable restoration time, or other criteria.

At block 410, the requested data may be restored.

At block 412, the method 400 may end.

At this point it should be noted that managing data compression in accordance with the present disclosure as described above typically involves the processing of input data and the generation of output data to some extent. This input data processing and output data generation may be implemented in hardware or software. For example, specific electronic components may be employed in a server or similar or related circuitry for implementing the functions associated with managing data compression in accordance with the present disclosure as described above. Alternatively, one or more processors operating in accordance with stored instructions may implement the functions associated with managing data compression in accordance with the present disclosure as described above. If such is the case, it is within the scope of the present disclosure that such instructions may be stored on one or more processor readable carriers (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for managing data compression comprising:
   receiving a request for a data operation;
   analyzing a data management policy associated with the request;
   identifying, using at least one computer processor, a compression level associated with one or more portions of data in the data operation based at least in part on the data management policy, wherein the data management policy specifies the compression level to use based at least in part on a data operation type; and
   identifying a compression algorithm to be used for one or more portions of data in the data operation, wherein identifying a compression algorithm comprises determining whether to use a lossy or lossless compression algorithm.

2. The method of claim 1, wherein the request for a data operation comprises a request for at least one of: a backup, an archive, a replication, data compression, and a copy.

3. The method of claim 1, wherein identifying a compression algorithm to be used for one or more portions of data is based at least in part on a file type associated with the data.

4. The method of claim 1, wherein identifying a compression algorithm to be used for one or more portions of data is based at least in part on the identified compression level.

5. The method of claim 1, wherein the data management policy specifies a compression level to use based at least in part on a destination storage media type.

6. The method of claim 1, wherein the data management policy specifies a maximum permissible compression ratio.

7. The method of claim 1, wherein the data management policy indicates when use of a lossy compression algorithm is permissible and wherein the determination of whether to use a lossy or lossless compression algorithm is based at least in part on the data management policy.

8. The method of claim 1, wherein the data operation comprises a backup and the compression level identified is based at least in part on an intended use of the one or more portions of data in the data operation.

9. The method of claim 1, wherein the data operation comprises a backup and the compression level identified is based at least in part on a group associated with the one or more portions of data in the data operation.

10. The method of claim 1, further comprising:
    receiving a request to restore data;
    identifying two or more copies of the requested data; and
    determining which copy of the requested data to restore based at least in part on one or more specified options.

11. The method of claim 10, wherein the one or more specified options include at least one of: a desired fidelity level of the requested data; a desired restoration speed; an identified location of the requested data; and an identified access to the requested data.

12. At least one non-transitory computer processor readable storage medium for storing a computer program of instructions configured to be readable by at least one processor for instructing the at least one processor to execute a computer process for performing the method as recited in claim 1.

13. An article of manufacture for managing data compression, the article of manufacture comprising:
    at least one non-transitory computer processor readable storage medium; and
    instructions carried on the at least one storage medium;
    wherein the instructions are configured to be readable from the at least one storage medium by at least one processor and thereby cause the at least one processor to operate so as to:
       receive a request for a data operation;
       analyze a data management policy associated with the request;
       identify a compression level associated with one or more portions of data in the data operation based at least in part on the data management policy, wherein the data management policy specifies the compression level to use based at least in part on a data operation type; and
       identify a compression algorithm to be used for one or more portions of data in the data operation, wherein identifying a compression algorithm comprises determining whether to use a lossy or lossless compression algorithm.

14. A system for managing data compression comprising:
one or more processors communicatively coupled to a server; wherein the server is configured to:
receive a request for a data operation;
analyze a data management policy associated with the request;
identify a compression level associated with one or more portions of data in the data operation based at least in part on the data management policy, wherein the data management policy specifies the compression level to use based at least in part on a data operation type; and
identify a compression algorithm to be used for one or more portions of data in the data operation, wherein identifying a compression algorithm comprises determining whether to use a lossy or lossless compression algorithm.

15. The system of claim 14, wherein the request for a data operation comprises a request for at least one of: a backup, an archive, a replication, data compression, and a copy.

16. The system of claim 14, wherein identifying a compression algorithm to be used for one or more portions of data is based at least in part on a file type associated with the data.

17. The system of claim 14, wherein the data management policy specifies a maximum permissible compression ratio.

18. The system of claim 14, wherein the data management policy indicates when use of a lossy compression algorithm is permissible and wherein the determination of whether to use a lossy or lossless compression algorithm is based at least in part on the data management policy.

19. The system of claim 14, wherein the data operation comprises a backup and the compression level identified is based at least in part on an intended use of the one or more portions of data in the data operation.

* * * * *